3,817,845
PHOTOPOLYMERIZABLE EPOXY SYSTEMS CONTAINING SULFOXIDE GELATION INHIBITORS
Jacob H. Feinberg, Hightstown, N.J., assignor to American Can Company, Greenwich, Conn.
No Drawing. Continuation-in-part of application Ser. No. 144,665, May 18, 1971, now Patent No. 3,711,391, dated Jan. 16, 1973. This application Nov. 7, 1972, Ser. No. 304,573
The portion of the term of the patent subsequent to Jan. 16, 1990, has been disclaimed
Int. Cl. B01j 1/10, 1/12
U.S. Cl. 204—159.11
30 Claims

ABSTRACT OF THE DISCLOSURE

Polymerization of epoxides and mixtures of epoxides with lactones and vinyl compounds, polymerizable through the action of cationic catalysts, is controlled by providing, in association with a radiation-sensitive catalyst precursor, a gelation inhibitor in the form of a sulfoxide compound such as methyl sulfoxide or n-propyl sulfoxide.

CROSS-REFERENCE TO RELATED APPLICATIONS

This application is a continuation-in-part application of U.S. application Ser. No. 144,665, filed May 18, 1971, now U.S. Pat. 3,711,391, issued Jan. 16, 1973.

BACKGROUND OF THE INVENTION

When a flowable liquid composition is applied to a substrate to form a coating or decoration, or to provide graphic or other information, it may be advantageous shortly after application to obtain rapid hardening, gelling, or curing of the coated material by irradiation for a brief period of time. This is particularly advantageous if the liquid coating composition is substantially free of volatile solvents which do not themselves participate in the curing, since the hardening then may be effected very rapidly without interference from evolving vapors and without producing waste gases. Practical coating systems of these types have been developed, utilizing photosensitive latent curing catalysts which respond to irradiation by releasing the catalytic agent.

One such coating system utilizes epoxide compounds, or an epoxide material blended from a number of epoxide compounds, individually having relatively low molecular weights, which may be formulated to provide good flow characteristics with or without the use of inert solvents. Cationic polymerization catalysts cause the epoxy ring to open through cleavage of a carbon-oxygen bond, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

The advantages of such radiation-responsive catalytic polymerization are made apparent by comparison with other available systems. Polymerization and crosslinking of epoxide compounds have been carried out by a variety of methods; see, for example, Chapter 5 of "Handbook of Epoxy Resins" by H. Lee and K. Neville, McGraw-Hill Book Company, 1967. A disadvantage of many of the so-called curing reactions is that they begin immediately on mixing reactants. Many of the curing techniques are based on two-component systems in which the two components must be isolated from each other until the curing reaction is to take place. Thus, only that quantity of material is mixed which can be used at once. Many of the curing reactions are slow and are unsuitable for applications which require a rapid transformation from the liquid or thermoplastic state to the solid state. Heat is frequently applied to stimulate or expedite reaction, but this is especially undesirable in applications where the epoxide material is in contact with a heat-sensitive material or where the reduction in viscosity on heating would cause "run-off" of the resin before curing takes place. Careful attention must be given to staying within the temperature limitations of the system involved. In order to prevent harmful effects of thermal curing, it is often necessary to extend the curing cycle an unreasonable length of time.

However, epoxide and related compositions containing photosensitive catalyst precursors have a tendency to gel upon standing, even in the absence of light or ultraviolet radiation. This tendency to undergo premature reaction is particularly troublesome in the case of formulations which are substantially free of unreactive diluents or solvents. The polymerization reaction is exothermal and, where large masses are involved, can generate sufficient heat to cause combustion of the epoxide resins.

SUMMARY OF THE INVENTION

Accordingly, new and improved stabilized polymerizable composition comprising epoxides and epoxides in admixture with monomers selected from the group consisting of lactones and vinyl-containing compounds are provided containing radiation-sensitive catalyst precursors and also gelation inhibitors which, upon admixture with the polymerizable materials, inhibit gelation of the reactive composition prior to irradiation. This is accomplished by the inclusion of a small quantity of one or more sulfoxides as gelation inhibitors. Such compositions may have greatly extended storage or pot life, premature reaction in the dark or at minimal levels of radiation being inhibited so that the mixtures may be retained for periods of days or more before application. Thus, in accordance with the process of the invention, a mixture first is formed of the polymerizable materials, a Lewis acid catalyst precursor, and the sulfoxide inhibitor. The resulting mixture, at a convenient time subsequently, is subjected to application of energy, such as actinic or electron beam irradiation, to release the Lewis acid catalyst in sufficient amounts to initiate the desired polymerization reaction.

DETAILED DESCRIPTION

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment, any polymerizable, monomeric or prepolymeric epoxide material or mixtures of such epoxide materials, of suitable viscosity alone or when dissolved in a suitable solvent, may be utilized. The classic epoxy resin is obtained by the well known reaction of epichlorohydrin and bisphenol A (4, 4'-isopropylidenediphenol). The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

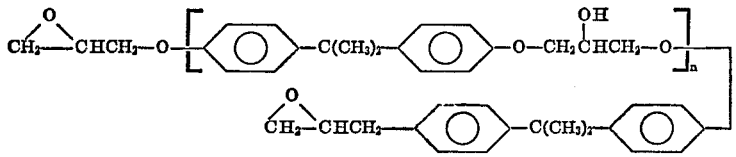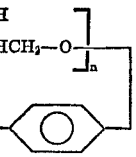

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n=0$), which may be named 2,2-bis[p-(2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms. Among these are 1,2 - epoxycyclohexane (cyclohexene oxide, also named 7-oxabicyclo[4.1.0]heptane); and vinylcyclohexene dioxide, more specifically named 3-(epoxyethyl)-7-oxabicyclo[4.1.0]heptane or 1,2 - epoxy-4-(epoxyethyl) cyclohexane. Ethylene oxide (oxirane,

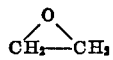

the simplest epoxy ring) and its homologues generally, e.g., propylene oxide (1,2-epoxypropane) and 2,3-epoxybutane, are themselves useful; other useful epoxidic cyclic ethers are the $C_3O$ ring compound trimethylene oxide (oxetane), derivatives thereof such as 3,3-bis(chloromethyl)oxetane (also named 2,2-bis(chloromethyl)-1,3-epoxypropane), and the $C_4O$ ring compound tetrahydrofuran, as examples. Other epoxidized cycloalkenes may be used, a readily available polycyclic diepoxide being dicyclopentadiene dioxide, more specifically identified as 3,4-8,9-diepoxytricyclo[5.2.1.0$^{2,6}$]decane. A suitable polyfunctional cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and glycidyl phenyl ether (1,2 - epoxy-3-phenoxypropane). Another readily available product is a mixture of ethers of the structure

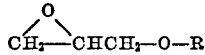

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolak prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4 - epoxycyclohexanecarboxylate; this same ester may be indexed under the name 7-oxabicyclo[4.1.0]hept - 3 - ylmethyl 7 - oxabicyclo[4.1.0]heptane-3-carboxylate. Another suitable diepoxide may be obtained as an ester of a substittued (epoxycycloalkyl)-methanol and a dibasic acid, for example, bis[3,4-epoxy-6-methylcyclohexyl)methyl] adipate, which may be named alternatively bis[(4 - methyl-7-oxabicyclo[4.1.0] hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy) butane. This diepoxide is related to the diglycidyl ether of bisphenol A, shown above as 2,2-bis[p-(2,3-epoxypropoxy)phenyl]propane.

Lactones tend to be readily polymerizable under the action of a cationic catalyst such as a Lewis acid. Lactone monomers suitable for admixture in the compositions of the invention may be any lactone which is polymerizable to higher molecular weights through the action of cationic catalysts. Such lactones are described and claimed in co-pending U.S. application Ser. No. 292,759, filed Sept. 27, 1972 entitled "Photopolymerization of Lactones." Lactones preferred for use in the instant compositions are cyclic esters, derived from hydroxy acids and represented by the general formula:

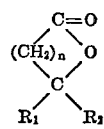

wherein $R_1$ and $R_2$ is hydrogen or alkyl, preferably lower alkyl containing 1 to 6 carbon atoms and $n$, the number of methylene groups, is an integer of 1–13. Such cyclic esters are derived from hydroxy acids containing between 3 to 15 carbon atoms including the beta, gamma, delta and epsilon forms of propiolactone, butyrolactone, caprolactone, pivalolactone, valerolactone, octanoic lactone, pentadecylic lactone, etc. Especially preferred are B-propiolactone and gammabutyrolactone. Many of such compounds are readily available commercially or their preparation is readily had by methods known in the art, for example, by intramolecular conversion of the corresponding hydroxy acid effected by heating.

Various ethylenically unsaturated materials are likewise suitable for admixture in the present invention. The preferred compounds are vinyl compounds, containing a polymerizable

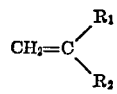

group wherein $R_1$ and $R_2$ may be hydrogen, aryl, alkyl, alkoxy, aryloxy, carbazolyl, etc. Such compounds include styrene, alkyl and halo-substituted styrenes such as α-methyl styrene, α-chlorostyrene, ethyl styrene; o, m and p-alkyl styrenes such as 2,4-dimethyl styrene, meta-propyl styrene, dichlorostyrene, bromostyrene, etc.; vinyl ethers such as isobutyl vinyl ether, cetyl vinyl ether, vinyl methyl ether, vinyl ethyl ether, dodecyl vinyl ether, vinyl 2-chloroethyl ether, vinyl 2-ethylhexyl ether, vinyl isopropyl ether, vinyl decyl ether, vinyl 2-ethoxyethyl ether, vinyl methoxymethyl ether, vinyl benzyl ether, vinyl 3-phenylpropyl ether, vinyl 1-cyclohexyl ethyl ether, vinyl phenyl ether, etc.; vinyl carbazoles such as N-vinyl carbazole, etc.

Such polymerizable monomer mixtures will usually contain a predominant proportion of epoxide material. In general, such mixtures will contain from about 0.25 to 98, preferably 10 to 50 parts epoxide per part of lactone or vinyl monomer.

The materials utilized as latent polymerization initiators in the process and compositions of the present invention are radiation-sensitive catalyst precursors which decompose to provide a Lewis acid upon application of energy. The energy required for effective decomposition may be thermal energy, applied simply by heating, or may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, and postheating also may be employed, although irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as $$[Ar\overset{+}{-}N\equiv N],$$

where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{-m}$. Thus, the photosensitive salt and its decomposition upon actinic irradiation may be depicted as follows:

$$[Ar\overset{+}{-}N\equiv N]_m[MX_{n+m}]^{-m} \xrightarrow{h\nu} mAr-X + mN_2 + MX_n, \quad (I)$$

where X is the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al. in *Journal of the American Chemical Society*, 83, 1928 (1961). Exemplifying a procedure of general utility, arenediazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

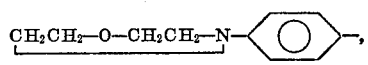

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium (2-methyl-4-nitrobenzenediazonium)
2-nitro-p-toluenediazonium (4-methyl-2-nitrobenzenediazonium)
6-nitro-2,4-xylenediazonium (2,4-dimethyl-6-nitrobenzenediazonium)
2-chloro-4-(dimethylamino)-5-methoxybenzenediazonium
4-chloro-2,5-dimethoxybenzenediazonium
2,4′,5-triethoxy-4-biphenyldiazonium (2,5-diethoxy-4-(p-ethoxyphenyl)benzenediazonium)
2,5-dimethoxy-4′-methyl-4-biphenyldiazonium (2,5-dimethoxy-4-(p-tolyl)benzenediazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-1-naphthalenediazonium.

Illustrative of the complex halogenide anions comprised in the photosensitive catalyst salts utilized in accordance with the present invention are the following:

tetrachloroferrate(III), $FeCl_4^-$
hexachlorostannate(IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
hexachloroantimonate(V), $SbCl_6^-$
pentachlorobismuthate(III), $BiCl_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility and stability in the epoxy formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which it exhibits absorption maxima.

TABLE I

| | M.P., °C. | Absorptance max., Nm. |
|---|---|---|
| 2,4-dichlorobenzenediazonium tetrachloroferrate(III) | 62–64 | 259, 285, 360 |
| p-Nitrobenzenediazonium tetrachloroferrate(III) | 93–95 | 243, 257, 310, 360 |
| p-Morpholinobenzenediazonium chloroferrate(III) | 121.5 | 240, 267, 313, 364 |
| 2,4-dichlorobenzenediazonium hexachlorostannate(IV) | 190 | 285 |
| p-Nitrobenzenediazonium hexachlorostannate(IV) | 126 | 258, 310 |
| 2,4-dichlorobenzenediazonium tetrafluoroborate | 152 | 285, ¹ 325–340 |
| p-Chlorobenzenediazonium hexafluorophosphate | 162–164 | 273 |
| 2,5-dichlorobenzenediazonium hexafluorophosphate | ² 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-Nitrobenzenediazonium hexafluorophosphate | 156 (178) | 258, 310 |
| o-Nitrobenzenediazonium hexafluorophosphate | 161.5 | |
| 4-nitro-o-toluenediazonium hexafluorophosphate | 123 (138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-Morpholinobenzenediazonium hexafluorophosphate | 162 (181) | 377 |
| 4-chloro-2,5-dimethoxybenzenediazonium hexafluorophosphate | 168–169 (198–208) | ¹ 243, 287, 398 |
| 2,5-dimethoxy-4-morpholinobenzenediazonium hexafluorophosphate | >135 | 266, 396 |
| 2-chloro-4-(dimethylamino)-5-methoxybenzenediazonium hexafluorophosphate | 111 | 273, 405 |
| 2,5-dimethoxy-4-(p-tolylthio) benzenediazonium hexafluorophosphate | 146 (155) | 358, 400 |
| 2,5-diethoxy-4-(p-tolylthio) benzenediazonium hexafluorophosphate | 147 (150) | ¹ 223, 247, 357, 397 |
| 2,5-dimethoxy-4'-methyl-4-biphenyl diazonium hexafluorophosphate | 167 | 405 |
| 2,4',5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-Nitrobenzenediazonium hexafluoroarsenate(V) | 141–144 (161) | 257, 310 |
| p-Morpholinobenzenediazonium hexafluoroarsenate(V) | 162 (176–177) | 257, 378 |
| 2,5-dichlorobenzenediazonium hexafluoroantimonate(V) | 161–162.5 | 238, 358 |
| p-Nitrobenzenediazonium hexafluoroantimonate(V) | 140–141 | 257, 308 |
| p-Morpholinobenzenediazonium hexafluoroantimonate(V) | 153 (177.5–180.5) | 254, 374 |
| 2,4-dichlorobenzenediazonium hexachloroantimonate(V) | 178–180 | 279, ¹ 322 |
| 2,4-dichlorobenzenediazonium pentachlorobismuthate(III) | 193.5–195 | 285, 313 |
| o-Nitrobenzenediazonium pentachlorobismuthate(III) | 166.5–168 | 285, 313 |

¹ Shoulder.
² Decomposition.

The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

In accordance with the present invention, sulfoxides are utilized in stabilizing amounts as gelation inhibitors for polymerizable compositions. Notable as sulfoxide compounds which conveniently may be used for this purpose are dialkyl sulfoxides, such as methyl sulfoxide (dimethyl sulfoxide), $(CH_3)_2S=O$. Additional examples are:

propyl sulfoxide (di-n-propyl sulfoxide),
$[CH_3(CH_2)_2]_2S=O$
butyl sulfoxide, $[CH_3(CH_2)_3]_2S=O$
hexyl sulfoxide, $[CH_3(CH_2)_5]_2S=O$
octadecyl sulfoxide, $[CH_3(CH_2)_{17}]_2S=O$
ethyl methyl sulfoxide,

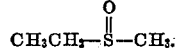

Alkyl aryl sulfoxides, diaryl sulfoxides, and sulfoxides with numerous other substituents such as alkaryl and aralkyl groups may be utilized, as represented, for example, by phenyl sulfoxide,

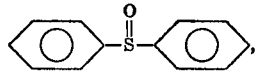

and methyl phenyl sulfoxide [(methylsulfinyl)benzene],

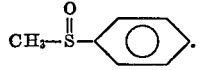

Sulfoxides in which the sulfur atom is part of a reasonably stable heterocyclic ring likewise are effective, as represented by tetramethylene sulfoxide (tetrahydrothiophene, 1-oxide),

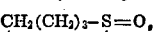

and pentamethylene sulfoxide (tetrahydro-2H-thiopyran, 1-oxide),

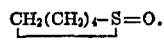

A great variety of sulfoxide compounds may be utilized as the gelation inhibitors in the compositions of the invention, provided only that the substituents on the sulfinyl,

group form a compound therewith which is substantially inert to the polymerizable material and to the catalyst precursor, these being the components which provide the desired end properties of the polymerizable composition as utilized in the polymerizing process of the invention. Of course, in confirming the inert character of such a gelation inhibitor, the absence of any substantial deleterious effects on the other constituents of the polymerizable composition need be ascertained only in the presence of the small stabilizing amount of the inhibitor to be used, and over a period of time commensurate with the desired storage or pot life of the composition.

It will be appreciated, therefore, that the polymerizable material, the radiation-sensitive catalyst precursor, and the sulfoxide gelation inhibitor should be compatible with each other in the sense of substantial freedom from mutual chemical attack during storage prior to irradiation. Moreover, the three components also should be compatible in the sense of mutual physical affinity. Thus, it would not be preferable to provide either the gelation inhibitor or the catalyst precursor in the mixture in the form of undissolved solid particles or immiscible liquid globules distributed through the mixture, even though insoluble dispersed materials might perform to some degree their intended functions, respectively, of counter-activity against prematurely formed Lewis acid, and of release of the Lewis acid catalyst upon eventual irradiation.

The catalyst precursors listed hereinabove are solids. Many of the sulfoxide gelation inhibitor compounds utilized in accordance with the present invention are oily liquids or syrups. While it often is possible to dissolve such ingredients in one or more of the polymerizable ingredients making up the epoxide or other polymerizable material utilized in the composition, it usually is more convenient for mixing purposes to provide these ingredients for the mixing operation already dissolved in a solvent. Thus the use of a small amount of a solvent medium such as acetone or anisole often is convenient for introducing liquid additives miscible in such medium, as well as solid additives. It has been found that commercial propylene carbonate (a cyclic propylene ester of carbonic acid, probably identified as primarily 4-methyl - 1,3 - dioxolan-2-one) makes a particularly good solvent for the aromatic diazonium complex salts and also for the sulfoxide compounds, and the propylene carbonate so used is completely miscible with epoxy resins. For example, the propylene carbonate may make up approximately 1% to 2% by weight of the entire polymerizable composition. If desired to avoid substantially the disadvantages of utilizing an inert solvent medium, the total amounts of any solvents which do not participate in the polymerization reactions, including a solvent such as propylene carbonate and particularly any volatile solvents present, should be kept below about 4% by weight.

Referring to equation I hereinabove showing the photolytic decomposition of the catalyst precursor, the halide Lewis acid $MX_n$ released reacts with the epoxide or other polymerizable material with a result exemplified by the following:

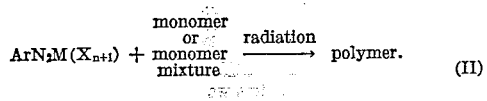

$$ArN_2M(X_{n+1}) + \begin{array}{c}\text{monomer}\\ \text{or}\\ \text{monomer}\\ \text{mixture}\end{array} \xrightarrow{\text{radiation}} \text{polymer.} \quad (II)$$

The cationic catalyst is believed to act by cleaving a carbon-oxygen epoxy or lactone bond, or by opening the double bond in a vinyl (ethylenic) monomer, initiating growth of a polymeric chain or permitting formation of a cross-linkage. A general application of the process embodied by equations I and II can be as follows: a diazonium complex salt, for example, as identified hereinabove, is admixed, with or without the use of a suitable solvent, with an epoxy monomer or epoxy monomer in admixture with a lactone or vinyl monomer and, as stabilizer, with a quantity of a sulfoxide. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the epoxy monomer or mixture of monomers. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, the mixture, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of the polymer in this embodiment.

The polymers produced by the polymerizing process of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, microimages for printed circuitry, thermoset vesicular images, microimages for information storage, decoration of paper, glass, and packages, and light-cured coatings.

The procedures for mixing the stabilized radiation-sensitive compositions of the present invention using the polymerizable materials are relatively simple. The polymerizable mixture is combined with the catalyst precursor and the sulfoxide inhibitor, if desired with a suitable inert volatile solvent. By such a suitable solvent is meant any solvent compound or mixture which boils below about 190° C. and which does not react appreciably with the polymerizable material, the catalyst precursor, or the inhibitor. Examples of such solvents include acetone, toluene, methyl ethyl ketone, ethyl ether, anisole, dimethyl ether of diethylene glycol (bis 2-methoxyethyl) ether, monochlorobenzene, 1,1,2,2-tetrachloroethane, o - chlorotoluene, o-dichlorobenzene, and trichloroethylene or mixtures thereof.

The amount of catalyst precursor employed should be sufficient to insure complete polymerization. It has been found that quite satisfactory results are obtained by providing a diazonium complex salt in amount by weight from about 0.5% to about 5% of the catalyst precursor relative to the weight of the polymerizable material provided, about 1% or less of the precursor being amply effective with some monomer-catalyst precursor systems.

The amount of the sulfoxide compound needed for the desired stabilizing effect is determined readily for given ingredients, using simple tests performed quite readily by the skilled formulator, preferably covering a range of test proportions to determine storage or pot life as a function of inhibitor proportion. A convenient test procedure involves viscometer measurements after storage in the dark for a period as long as the maximum storage life needed for the operations in which the stabilized mixed polymerizable composition is to be used. Most coating and printing operations, for example, can utilize formulations having a viscosity within a substantial predetermined range, whether a relatively low-viscosity or high-viscosity range, and use of the inhibitor can maintain the formulations within the desired viscosity ranges for a much longer period. The viscosity of the freshly prepared mixture, even if solvent-free, is low enough in some cases to permit quite substantial polymerization before the composition becomes too viscous to be usable.

The examples set out hereinbelow will indicate a range of proportions within which the sulfoxide inhibitor usually is required. It appears that amounts of the inhibitor less than 0.05% by weight, relative to the weight of the entire polymerizable composition, can be markedly effective for many days of storage, while amounts over 0.5% by weight seldom are needed. In general, the inhibitor preferably is present in an amount by weight equal to between about 0.005% and about 1% of the weight of the composition. Excessive amounts of inhibitor might impair the stability. It should be kept in mind that unnecessarily large amounts of the inhibitor can decrease quite markedly the catalytic potential of the catalyst precursor, and even may poison the catalyst to the extent that substantial or sufficient curing cannot occur in a reasonable length of time after application of energy to the composition. Unnecessarily large proportions of the sulfoxide also may cause undesirable discoloration or odor. For these reasons, provision of the inhibitor in excess of suitable stabilizing amounts should be avoided.

It may be desirable to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursor needed rarely exceeds 5% of the entire weight of the composition, and an amount of the gelation inhibitor less than about 1% of the total weight usually is sufficient.

The following examples will serve further to illustrate the present invention.

EXAMPLE 1

Several large batches were prepared by mixing together the following epoxides in the indicated proportions:

| Epoxide | Epoxy equiv. wt. | 25° C., viscosity, cps. | Parts by weight | (percent) |
|---|---|---|---|---|
| Diglycidyl ether of bisphenol A | 172–178 | 4,000–6,000 | 20 | (60.6%) |
| (3,4-epoxycyclohexyl)-methyl 3,4-epoxycyclohexane-carboxylate | 131–143 | 350–450 | 10 | (30.3%) |
| Alkyl glycidyl ether in which alkyl groups are predominantly dodecyl and tetradecyl | 286 | 8.5 | 3 | (9.1%) |

A number of 350 gram samples were withdrawn from these batches, each sample containing very nearly 212 g., 106 g., and 31.8 g. respectively of the epoxide ingredients specified above. To each such sample were added 4.0 ml. (4.8 g.) of propylene carbonate, containing dissolved therein 2.45 g. of p-chlorobenzenediazonium hexafluorophosphate as the catalyst precursor. Several such samples, containing no additional materials, were observed as control samples, and viscosity measurements were made at 23° C. using a Brookfield viscometer. One such control sample had an initial viscosity, immediately after mixing, of 675 centipoises; at the end of 2 days the viscosity was 6,670 cps., and the sample had gelled in less than 7 days. Another such control sample had an initial viscosity of 685 cps., which rose to 9,800 cps. after 3 days, and this sample likewise had gelled before a week had passed.

EXAMPLE 2

A 350 g. aliquot of the epoxide blend described in Example 1 was prepared in the same manner, likewise containing 2.45 g. of the catalyst precursor dissolved in 4.0 ml. of propylene carbonate, but with 0.40 g. (0.11% of the total weight) of methyl sulfoxide dissolved additionally in the propylene carbonate before admixture with the epoxide blend. This mixture was found initially to have a viscosity at 23° C. of 710 cps. After 7 days the viscosity had increased to 875 cps.

When this mixture had aged for a period of about 48 hours, a portion was coated on paperboard, using a drawbar to provide a coating of the order of 0.0005 inch thick when dry. After exposure for 5 seconds to a 360-watt high pressure mercury lamp at a distance of 3 inches, the coated film was found to have cured to a tough, solid finish. This indicated that the presence of the sulfoxide compound did not interfere with activation of the catalyst precursor, using the energy provided by ultraviolet light irradiation to effect polymerization. It is noteworthy that the control sample without sulfoxide already had commenced to gel after a similar period of 2 days and had reached a viscosity intractably high for making such a coating, while the mixture of Example 2 was suitable for coating with equal ease after aging for 7 days.

EXAMPLE 3

Another 350 g. portion of the epoxide blend of Example 1 was mixed with 4.0 ml. of propylene carbonate containing 2.45 g. of the same catalyst precursor and only 0.15 g. (0.04%) of methyl sulfoxide. This formulation initially had a viscosity of 800 cps. After 7 days the viscosity had increased to a value at 23° C. of 1,270 cps.

EXAMPLE 4

To a 350 g. aliquot of the epoxide mixture described in Example 1 was added in like manner 4.0 ml. of propylene carbonate in which was dissolved 2.45 g. of p-chlorobenzenediazonium hexafluorophosphate and 0.70 g. (0.20%) of butyl sulfoxide. The composition had an initial viscosity of 840 cps. Eight days later the viscosity had increased to 930 cps.

EXAMPLE 5

Again a 350 g. aliquot was withdrawn from a mixture of epoxides as described in Example 1, to which was added 2.45 g. of the catalyst precursor used in Example 1 dissolved in 4 ml. of propylene carbonate containing additionally 0.58 g. (0.16%) of propyl sulfoxide, this mixture then having a viscosity of 860 cps. After 8 days the viscosity was measured at a somewhat higher value of 890 cps.

A portion of this mixture aged 8 days was coated on paperboard, using a drawbar to provide a coating of the order of 0.0005 inch thick. After 5 seconds' exposure to a 360-watt high pressure mercury lamp at a distance of 3 inches, the coated film had cured completely to a tough, solid finish.

EXAMPLE 6

A mixture was formed of a 350 g. portion of the above-described epoxide resin blend and 4.0 ml. of propylene carbonate containing 2.45 g. of p-chlorobenzenediazonium hexafluorophosphate and 0.45 g. (.13%) of the 1-oxide (that is, the S-oxide) of tetrahydrothiophene (tetramethylene sulfoxide). This formulation initially had a viscosity of 760 cps. After 6 days the viscosity had increased to 862 cps.

Again, as with the mixture of Example 2, the mixture of Example 6 containing tetramethylene sulfoxide was used after aging 6 days to provide a thin coating on paperboard, which cured readily to a tough, solid finish in no more than 5 seconds.

EXAMPLE 7

Several large batches were prepared by mixing together the following epoxides in the indicated proportions:

| Epoxide | Epoxy equiv. wt. | 25° C., viscosity, cps. | Parts by weight |
|---|---|---|---|
| Diglycidyl ether of bisphenol A | 172–178 | 4,000–6,000 | 55 |
| (3,4-epoxycyclohexyl)-methyl 3,4-epoxycyclohexanecarboxylate | 131–143 | 350–450 | 30 |
| Alkyl glycidyl ether in which alkyl groups are predominantly dodecyl and tetradecyl | 286 | 8.5 | 15 |

A number of 50 gram samples were withdrawn from these batches. To each such sample was added 1.10 g. of propylene carbonate, containing dissolved therein 0.55 g. of 4-chlorobenzene diazonium hexafluorophosphate as the catalyst precursor. Viscosity measurements were made at 25° C., unless otherwise indicated, employing a Brookfield viscometer.

(a) A 10 g. aliquot of a mixture containing 50 g. of the epoxide blend described above, 5.0 g. styrene, 0.55 g. 4-chlorophenyl diazonium hexafluorophosphate and 1.10 g. propylene carbonate was found to have an initial viscosity at 25° C. of 98 centipoises. After 20 hours, the viscosity had increased to 1,870 centipoises.

(b) A 10 g. aliquot of the mixture of (a) above but with 0.02 g. dimethyl sulfoxide dissolved therein was found to have a viscosity after 20 hours of 125 centipoises.

EXAMPLE 8

(a) A 10 g. aliquot of a mixture containing 50 g. of the epoxide blend described in Example 7, 5.0 g. gamma-butyrolactone, 0.55 g. 4-chlorobenzene diazonium hexafluorophosphate and 1.10 g. propylene carbonate was stored at 0° C. for 16 hours. The mixture was found initially to have a viscosity of 133 cps. at 25° C. After standing at room temperature for an additional 2 hours, the viscosity had increased to 2,420 cps.

(b) Another 10 g. aliquot of the same composition as in (a) above but with 0.02 g. dimethyl sulfoxide added thereto was found to have a viscosity of 115 cps. at 25°

C. after storage at 0° C. for 16 hours. When measured after an additional 2 hours at room temperature, the viscosity was found to be 116 cps.

EXAMPLE 9

(a) A 10 g. aliquot of a mixture containing 50 g. of the epoxide blend described in Example 7, 1.5 g. dodecyl vinyl ether, 0.52 g. 4-chlorobenzene diazonium hexafluorophosphate and 1.04 g. propylene carbonate was found to gel to a solid state within 45 minutes.

(b) Another 10 g. aliquot of the same composition as in (a) above but with 0.02 g. dimethyl sulfoxide added thereto was found to reach the gel state after 24 hours.

It has been found generally that the sulfoxide-bearing compositions of the type described hereinabove can be utilized readily, for forming desired shapes, at any time during the entire period after mixing during which the viscosity remains within the practical limits for the desired forming or shaping operation; and further that activation of the latent catalyst then can be effected by irradiation to release the Lewis acid catalyst without any noticeable interference due to the presence of the sulfoxide compound.

While there have been described particular embodiments of the invention, including those at present considered to be the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A stabilized polymerizable composition, comprising a polymerizable material consisting essentially of:

a monomeric or prepolymeric epoxide or mixture thereof in admixture with a monomer selected from the group consisting of lactones and vinyl-containing compounds having the general formula:

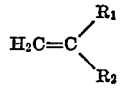

wherein $R_1$ and $R_2$ are hydrogen, alkyl, alkoxy, aryl, aryloxy, halogen, haloalkyl, haloaryl and carbazolyl; said mixture being poylymerizable to higher molecular weights through the action of a cationic catalyst;

a radiation-sensitive catalyst precursor which decomposes upon application of energy to provide a Lewis acid effective to initiate polymerization of said polymerizable material, said precursor being an aromatic diazonium salt of a complex halogenide;

and a stabilizing amount of a gelation inhibitor, in the form of a sulfoxide, for counteracting prematurely formed Lewis acid, said stabilizing amount of the inhibitor being substantially inert to said polymerizable material and said catalyst precursor.

2. The composition of Claim 1, in which the monomeric or prepolymeric epoxide is a mixture of epoxides.

3. The composition of Claim 1, in which the polymerizable material is a mixture of epoxides and a lactone.

4. The compositoion of Claim 3, in which said lactone is gamma-butyro-lactone.

5. The composition of Claim 1, in which the polymerizable material is a mixture of epoxides and a vinyl-containing compound.

6. The composition of Claim 5, in which said vinyl-containing compound is styrene.

7. The composition of Claim 5, in which said vinyl-containing compound is dodecyl vinyl ether.

8. The composition of Claim 1, in which said catalyst precursor is present in an amount equal to between about 0.5% and about 5% of the weight of said polymerizable material present in the composition.

9. The composition of Claim 1, in which said gelation inhibitor is a dialkyl sulfoxide.

10. The composition of Claim 1, in which said gelation inhibitor is methyl sulfoxide.

11. The composition of Claim 1, in which said gelation inhibitor is propyl sulfoxide.

12. The composition of Claim 1, in which said gelation inhibitor is the 1-oxide of tetrahydrothiophene.

13. The composition of Claim 1, in which said sulfoxide gelation inhibitor is present in an amount by weight equal to between about 0.005% and about 1% of the weight of the composition.

14. The composition of Claim 1, in which the total amount of any unpolymerizable volatile solvents present in said composition is less than about 4% by weight of the composition.

15. A stabilized polymerizable composition comprising a polymerizable material consisting essentially of:

a liquid monomeric or prepolymeric epoxide material or mixture of epoxide materials with a monomer selected from the group consisting of gamma butyrolactone, styrene and dodecyl vinyl ether, said mixture being polymerizable to higher molecular weights through the action of a cationic catalyst;

an aromatic diazonium salt of a complex halogenide which decomposes upon application of energy to provide a halide Lewis acid effective to initiate polymerization of said epoxide material, said salt being present in an amount equal to between about 0.5% and about 5% of the weight of said epoxide material present in said composition;

and a gelation inhibitor, for counteracting prematurely formed Lewis acid, in the form of a dialkyl sulfoxide present in an amount by weight equal to between about 0.005% and about 1% of the weight of said composition.

16. The composition of Claim 15, in which the total amount of any unpolymerizable volatile solvents present in said composition is less than about 4% by weight of the liquid composition.

17. The composition of Claim 16, in which the polymerizable material is a mixture of epoxides and gamma-butyrolactone.

18. The composition of Claim 16, in which the polymerizable material is a mixture of epoxides and styrene.

19. The composition of Claim 16, in which the polymerizable material is a mixture of epoxides and dodecyl vinyl ether.

20. The process of polymerizing a polymerizable material consisting essentially of monomeric or prepolymeric epoxides or mixtures thereof in admixture with a monomer selected from the group consisting of lactones and vinyl-containing compounds having the general formula:

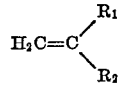

wherein $R_1$ and $R_2$ are hydrogen, alkyl, alkoxy, aryl, aryloxy, halogen, haloalkyl, haloaryl and carbazolyl;

said mixture being polymerizable to higher molecular weights through the action af a cationic catalyst, comprising:

forming a mixture of the polymerizable material with a radiation-sensitive catalyst precursor with decomposes upon application of energy to provide a Lewis acid effective to initiate polymerization of said polymerizable material, said precursor being an aromatic diazonium salt of a complex halogenide, and also a stabilizing amount of a gelation inhibitor for counteracting prematurely formed Lewis acid, said inhibitor being a sulfoxide compound, and said stabilizing amount of the sulfoxide inhibitor being substantially inert to said polymerizable material and said catalyst precursor;

and subsequently applying energy to the resulting mixture to release said Lewis acid in sufficient amounts to effect substantial polymerization of the polymerizable material.

21. The process of Claim 20, in which the monomeric or prepolymeric epoxide is a mixture of epoxides.

22. The process of Claim 20, in which the polymerizable material is a mixture of epoxides and a lactone.

23. The process of Claim 20, in which the polymerizable material is a mixture of epoxides and a vinyl-containing compound.

24. The process of Claim 20, in which said catalyst precursor is mixed with said polymerizable material in an amount equal to between about 0.5% and about 5% of the weight of the polymerizable material.

25. The process of Claim 20, in which said gelation inhibitor mixed with the polymerizable material and the catalyst precursor is a dialkyl sulfoxide.

26. The process of Claim 25, in which the gelation inhibitor is methyl sulfoxide.

27. The process of Claim 25, in which the gelation inhibitor is propyl sulfoxide.

28. The process of Claim 20, in which said gelation inhibitor mixed with the polymerizable material and the catalyst precursor is the 1-oxide of tetrahydrothiophene.

29. The process of Claim 20, in which said gelation inhibitor is mixed with said polymerizable material and said catalyst precursor in an amount equal to between about 0.005% and about 1% of the weight of the resulting mixture.

30. The process of Claim 20, in which said mixture formed of the polymerizable material, the catalyst precursor, and the gelation inhibitor contains less than about 4% by weight of any unpolymerizable volatile solvents which may be present therein.

References Cited

UNITED STATES PATENTS 3,711,391   1/1973   Feinberg _____ 204—159.11

MURRAY TILLMAN, Primary Examiner

R. B. TURER, Assistant Examiner

U.S. Cl. X.R.

96—75, 91 R, 115 P; 117—93.31, 132 BE, 155 R; 204—159.14, 159.15, 159.18; 159.22, 159.24; 260—2 EP, 2 A, 47 EP, 47 UP, 78.3, 88.3 R, 91.1 A, 91.1 M, 91.5, 93.5 R, 94.9 GA, 343.6, 343.9, 348 C, 348 R, 830 TW, 836, 837 R, 837 PV